United States Patent
Ohta

(10) Patent No.: US 7,365,873 B2
(45) Date of Patent: Apr. 29, 2008

(54) IMAGE PROCESSING APPARATUS, IMAGE PROCESSING METHOD, AND STORAGE MEDIUM

(75) Inventor: Kenichi Ohta, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 09/769,330

(22) Filed: Jan. 26, 2001

(65) Prior Publication Data

US 2002/0051230 A1    May 2, 2002

(30) Foreign Application Priority Data

Jan. 27, 2000  (JP)  .............................. 2000-018794
Jan. 27, 2000  (JP)  .............................. 2000-018795

(51) Int. Cl.
*G06F 15/00* (2006.01)
*G06K 1/00* (2006.01)

(52) U.S. Cl. ...................... 358/1.17; 358/1.2; 358/1.18

(58) Field of Classification Search ................. 358/1.9, 358/3.05, 448, 450, 453, 538, 464, 462, 501; 382/176, 256
See application file for complete search history.

(56) References Cited

U.S. PATENT DOCUMENTS

| | | | | |
|---|---|---|---|---|
| 5,260,810 A | * | 11/1993 | Kanno et al. | 358/452 |
| 5,392,137 A | * | 2/1995 | Okubo | 358/462 |
| 5,465,307 A | * | 11/1995 | Azumaya et al. | 382/165 |
| 5,719,967 A | * | 2/1998 | Sekine | 382/266 |
| 5,729,664 A | * | 3/1998 | Ishikawa | 358/1.9 |
| 5,778,092 A | * | 7/1998 | MacLeod et al. | 382/176 |
| 5,838,839 A | * | 11/1998 | Seki et al. | 382/299 |
| 5,953,464 A | * | 9/1999 | Harrington | 382/299 |
| 6,005,989 A | * | 12/1999 | Frederic | 382/300 |
| 6,668,102 B2 | * | 12/2003 | Chiba et al. | 382/305 |
| 6,735,740 B2 | * | 5/2004 | Sakai et al. | 715/526 |

* cited by examiner

*Primary Examiner*—David Moore
*Assistant Examiner*—James A. Thompson
(74) *Attorney, Agent, or Firm*—Fitzpatrick, Cella, Harper & Scinto

(57) ABSTRACT

Color image data is inputted, flag data indicative of attributes (character image, figure image, mesh image) of each pixel of an inputted image is generated, image processes, an enlargement, and a reduction according to the flag data are executed, the processed data is outputted to a printer, and an image of a high quality is formed.

14 Claims, 11 Drawing Sheets

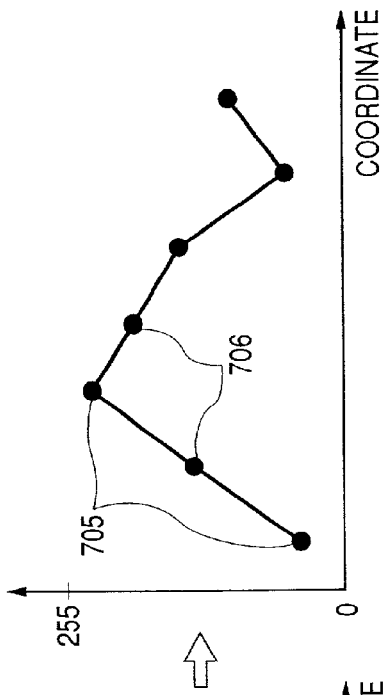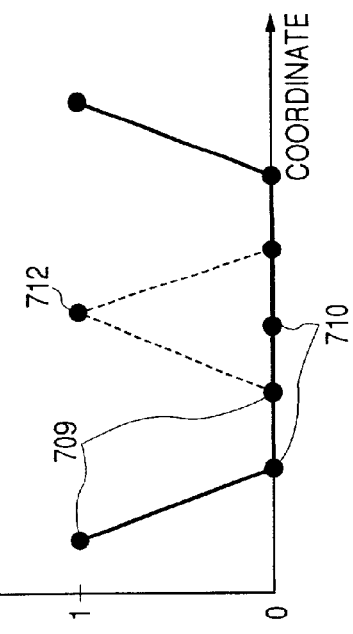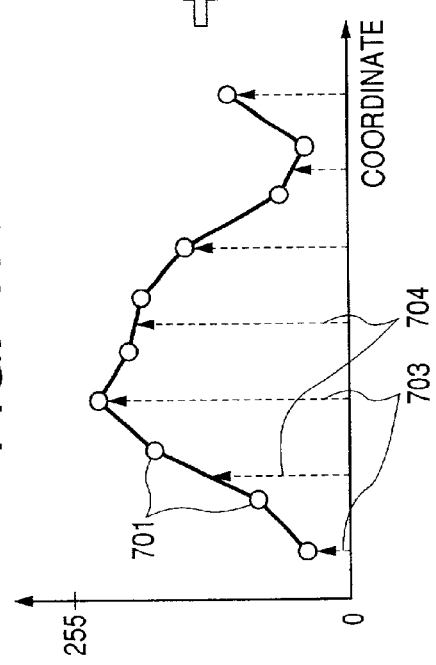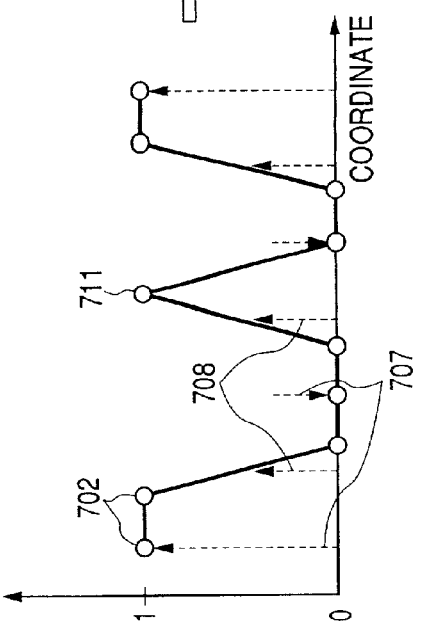

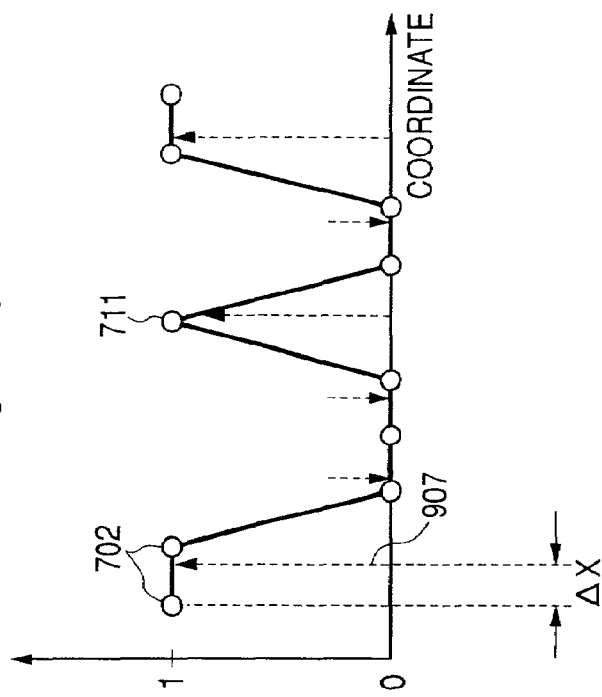
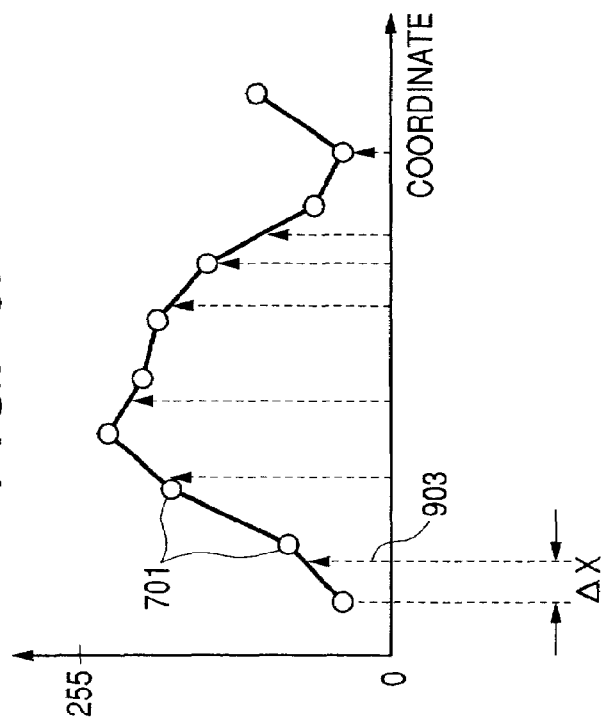

IMAGE PROCESSING APPARATUS, IMAGE PROCESSING METHOD, AND STORAGE MEDIUM

BACKGROUND OF THE INVENTION

1. Field of the Invention

The invention relates to an image processing apparatus and an image processing method for performing a pixel density conversion of an image and to a storage medium.

2. Related Background Art

Hitherto, what is called a color original copying apparatus as shown in FIG. 10 has been known as a system for digitally reading a color original image and generating a copy image.

In FIG. 10, reference numeral 1001 denotes an image scanner for reading an original and performing a digital signal process, and 1002 indicates a printer. An image corresponding to an original image read by the image scanner 1001 is printed and outputted onto a paper in a full color by the printer 1002. In the image scanner 1001, reference numeral 1000 denotes a mirror surface pressure plate. An original 1004 put on a copyboard glass (hereinafter, referred to as a platen) 1003 is irradiated by lamps 1005 and an obtained image is guided to mirrors 1006, 1007, and 1008. An image is formed by a lens 1009 onto a solid-state image pickup device sensor (hereinafter, referred to as CCD) 1010 of three lines. Three image signals of red (R), green (G), and blue (B) as full color information are sent to a signal process unit 1011. The lamps 1005 and mirror 1006 are mechanically moved in the direction perpendicular to the electric scanning (main-scan) direction of the line sensor at a speed v, and the mirrors 1007 and 1008 are mechanically moved in the direction perpendicular to the electric scanning (main-scan) direction of the line sensor at a speed ($\frac{1}{2}$)v, thereby scanning (sub-scan) the whole surface of the original. The original 1004 is read at a resolution of 600 dpi (dots/inch) in both main-scan and sub-scan.

The signal process unit 1011 electrically processes the read image signal, separates it into color components of magenta (M), cyan (C), yellow (Y), and black (Bk), and sends them to the printer 1002. A color component of one of M, C, Y, and Bk is sent to the printer 1002 with respect to one scan of the original in the image scanner 1001. One print-out operation is completed by scanning the original four times in total.

Pixel signals of M, C, Y, and Bk sent from the image scanner 1001 are transmitted to a laser driver 1012. The laser driver 1012 modulates a semiconductor laser 1013 in accordance with the transmitted image signals. A laser beam scans the surface of a photosensitive drum 1017 through a polygon mirror 1014, an f-θ lens 1015, and a mirror 1016. Image data is written at a resolution of 600 dpi (dots/inch) in both main-scan and sub-scan in a manner similar to the reading mode.

Reference numeral 1018 denotes a rotary developer comprising a magenta development unit 1019, a cyan development unit 1020, a yellow development unit 1021, and a black development unit 1022. The four development units are alternately come into contact with the photosensitive drum 1017, thereby developing an electrostatic latent image formed on the photosensitive drum by toners.

Reference numeral 1023 denotes a transfer drum. The paper which is fed from a sheet cassette 1024 or 1025 is wound around the transfer drum 1023, thereby transferring the images developed on the photosensitive drum onto the paper.

After the images of four colors of M, C, Y, and Bk were sequentially transferred as mentioned above, the paper passes through a fixing unit 1026, the toners are fixed onto the paper, and thereafter, the paper is delivered.

According to the conventional example as described above, it is fundamentally necessary that the image scanner for reading the original and the printer for outputting a copy image synchronously operate. That is, the image signals of R, G, and B read by the CCD sensor are processed every pixel by the signal process unit, converted into image signals of M, C, Y, and Bk, successively sent to the printer, and written onto the photosensitive drum by the laser beam, thereby forming the copy image.

In the conventional example, one of M, C, Y, and Bk is used for forming the image and the image forming process is repeated with respect to each color, so that the original is continuously read four times.

It is not always necessary to continuously perform the reading operation of the original four times but there is also a construction such that the image data which was read only once is stored in temporary storing means and the stored image data is read out and outputted synchronously with the image formation of each of M, C, Y, and Bk.

However, although there is no need to store the image data into the storing means in the former construction, the scanner and printer need to simultaneously operate. Therefore, for example, in the case where a heating unit of the fixing unit (in case of an ordinary thermal fixing type) of the printer is not sufficiently heated, since the printer is in a standby mode, the copying operation and the original reading operation cannot be performed.

In case of copying a plurality of copies of each of a plurality of originals, it is necessary to perform the operation for reading one original plural times in correspondence to the output of a plurality of copies. The reading operation has to be performed with respect to each of a plurality of originals. Thus, a time which the user has to expend for such a purpose is very long.

In the latter construction, the scanner and printer can perform the original reading operation asynchronously and, also in case of outputting a plurality of copies, it is sufficient to perform the original reading operation once per original. However, since an amount of image data to be stored in the storing means is extremely large, it is difficult to simultaneously store a plurality of original images. Therefore, if it is intended to read a plurality of original images in a lump and realize an exchange of pages, a synthesis output of a plurality of original images, or the like after completion of the reading operation, a storage device of a very large capacity is needed and it is not practical. It is also impossible to perform a layout synthesis by enlargement and reduction of the stored image data.

In the case where it is intended to perform the optimum process in consideration of a feature of the image data, it is necessary to detect the feature of the image. A point of making handling of the image easy and outputting the image of a high quality in case of performing the layout synthesis by the enlargement and reduction in the process using the feature data is not sufficiently examined.

SUMMARY OF THE INVENTION

It is an object of the invention to provide an image processing apparatus and its control method, in which the above problems can be solved.

Another object of the invention is to provide an image processing apparatus and its control method, in which an image output of a high quality can be outputted while reducing a memory capacity of an image.

Still another object of the invention is to provide an image processing apparatus and its control method, in which the same image processes can be performed for a copy of an original image and an image output of data from a computer.

Further another object of the invention is to provide an image processing apparatus and its control method, in which proper image processes can be performed for each of parts constructing an image and an image output of a high quality can be performed.

The above and other objects and features of the present invention will become apparent from the following detailed description and the appended claims with reference to the accompanying drawings.

BRIEF DESCRIPTION OF THE DRAWINGS

FIGS. 7A, 7B, 7C, and 7D are diagrams for explaining an example of a pixel density converting method;

FIGS. 9A and 9B are diagrams for explaining an example of an offset process in the pixel density converting method;

DETAILED DESCRIPTION OF THE PREFERRED EMBODIMENT

First Embodiment

An embodiment of the invention will now be described hereinbelow with reference to the drawings.

Figure 1:
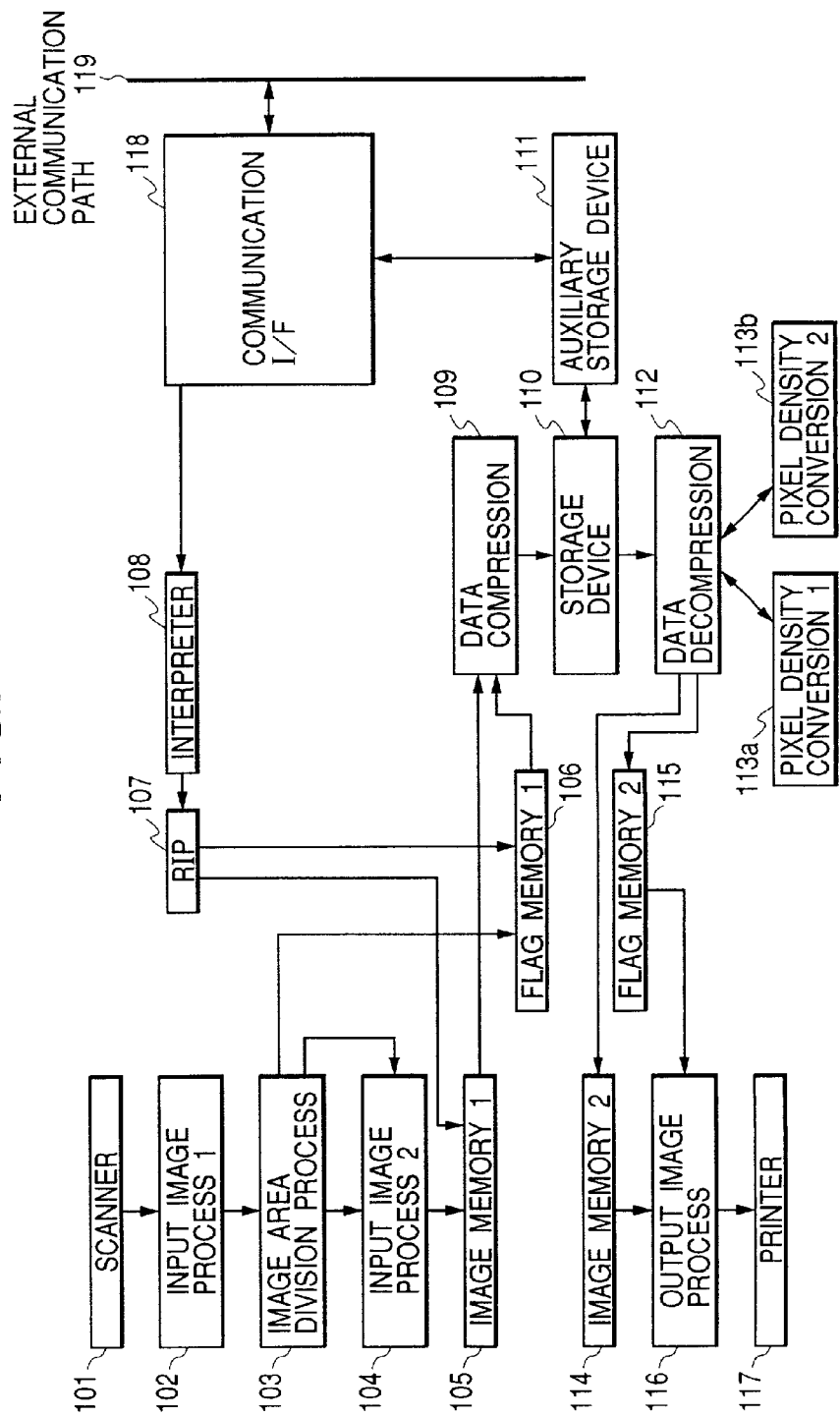
FIG. 1 is a block diagram showing a schematic construction of an image processing apparatus to which the invention can be applied.

FIG. 1 is a block diagram showing an example of a construction of a copying apparatus of the first embodiment.

(Reading Unit)

Figure 10:
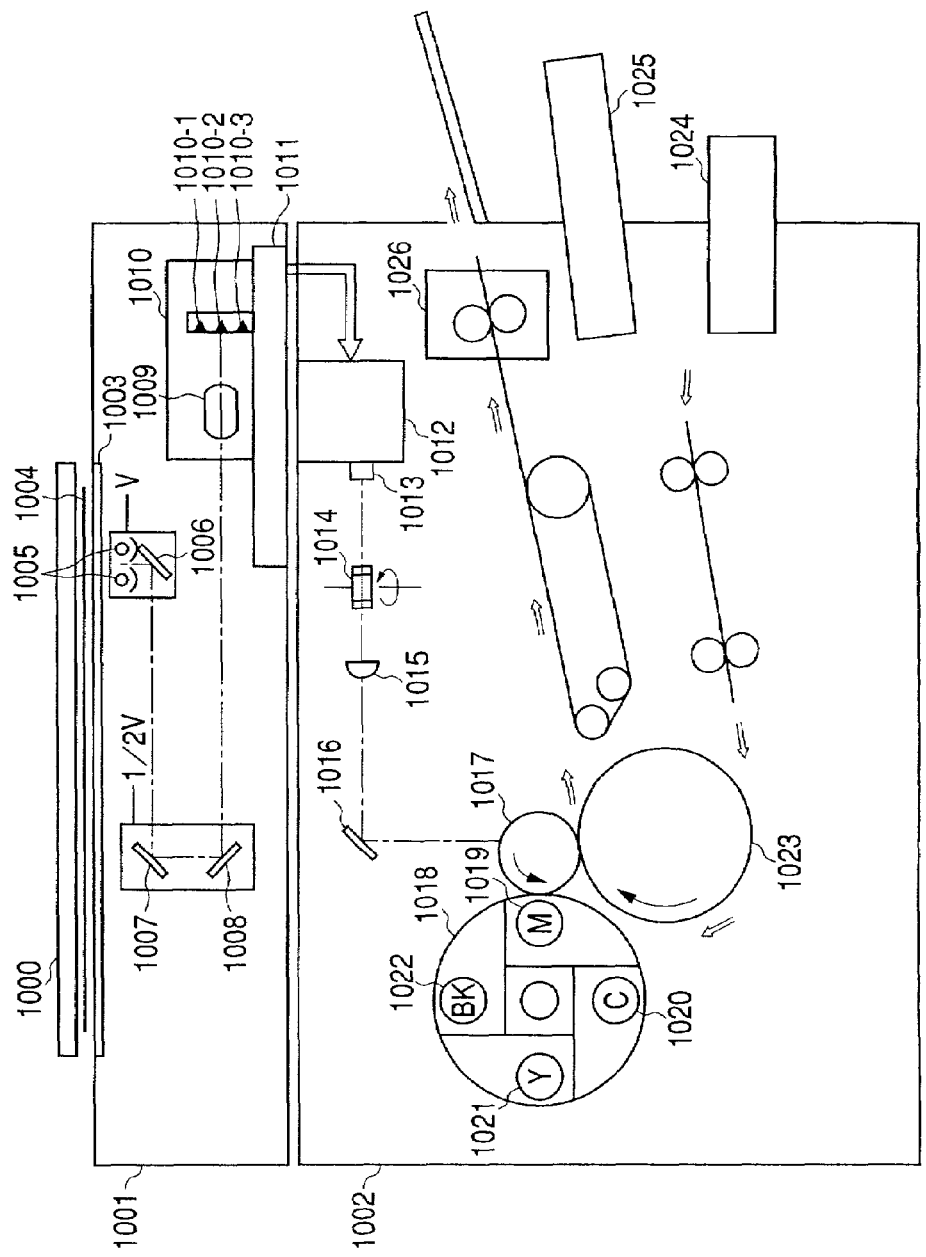
FIG. 10 is a diagram for explaining a conventional color image copying apparatus.

An original to be copied is put on a copyboard glass (corresponding to 1003 in FIG. 10) of a scanner 101 and read. As shown in FIG. 10, the scanner digitally reads an image of the original every pixel by a 3-line color CCD and transfers color image signals to an input image process unit 102. In the input image process unit 102, well-known image processes such as shading correction, CCD inter-line correction, color correction, and the like are performed to the RGB color image signals sent from the scanner.

Reference numeral 103 denotes a block for performing an image area dividing process to the image processed color image signals which are outputted from the input image process unit 102. This block is an image area division process unit for detecting a feature of an image such as photograph area, character area, mesh area, or the like every pixel of the input image and generating flag data indicative of attributes of each image area.

(Image Area Dividing Process)

The image area division process unit will now be described. The image area dividing process is performed for extracting a feature of the original image in order to perform optimum image processes in accordance with the feature of the image included in the original image and generating a signal showing the image area attributes (hereinafter, such a signal is referred to as flag data). For example, various image areas such as full color photograph area of continuous gradation, character area of monochromatic color of black, mesh print area like a newspaper print, and the like exist mixedly in the original. If those image areas are uniformly processed by a same image processing procedure and resultant data is outputted, a preferable picture quality cannot be obtained in many cases. To solve such a problem, therefore, in the first embodiment, FIG. 2 shows a specific procedure for detecting attributes of the image data included in the original image by using the color image signals processed by the input image process unit 102 and generating flag data for identifying the detected attributes.

Figure 2:
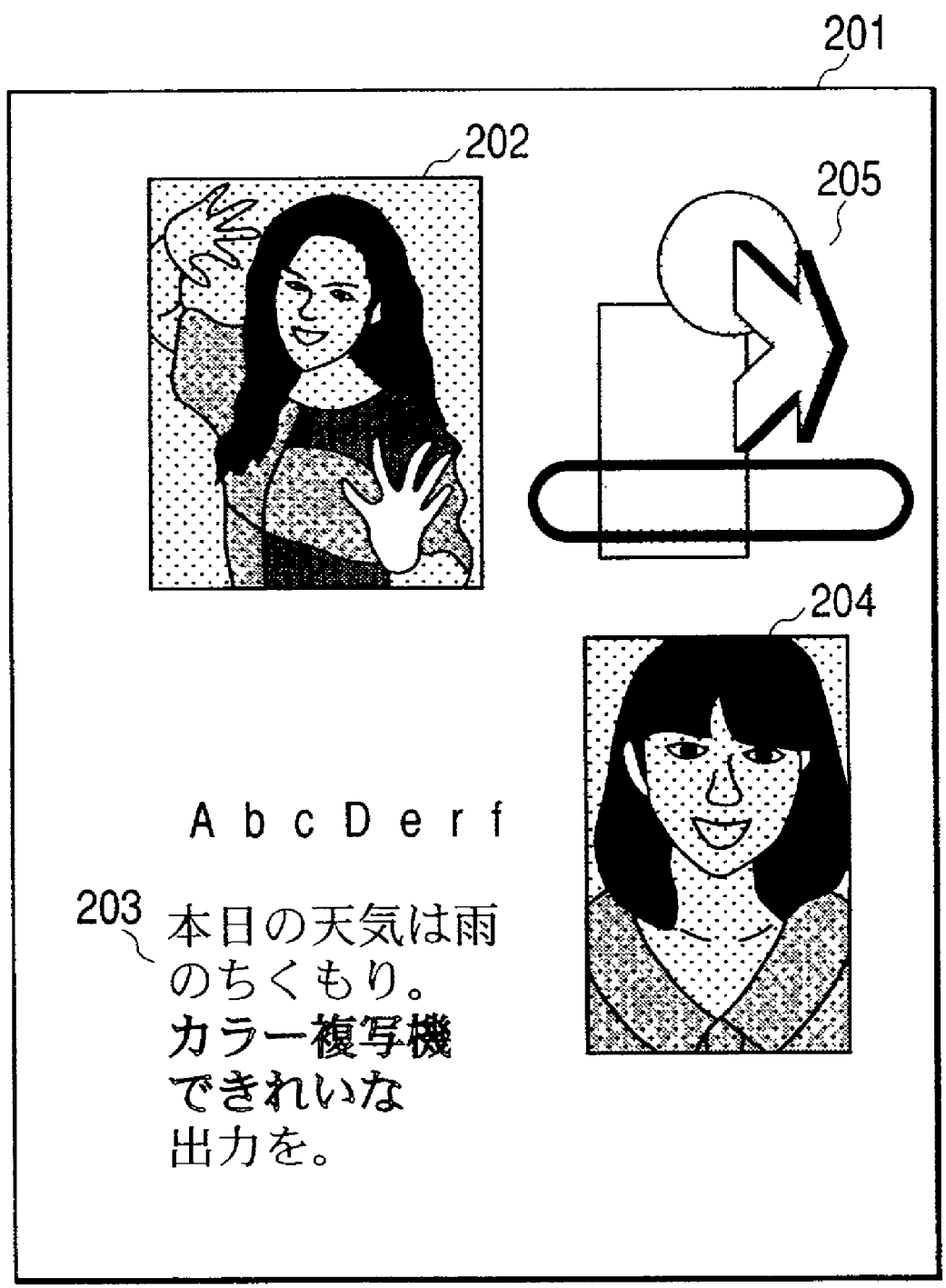
FIG. 2 is a diagram showing an example of an original image.
Figure 3:
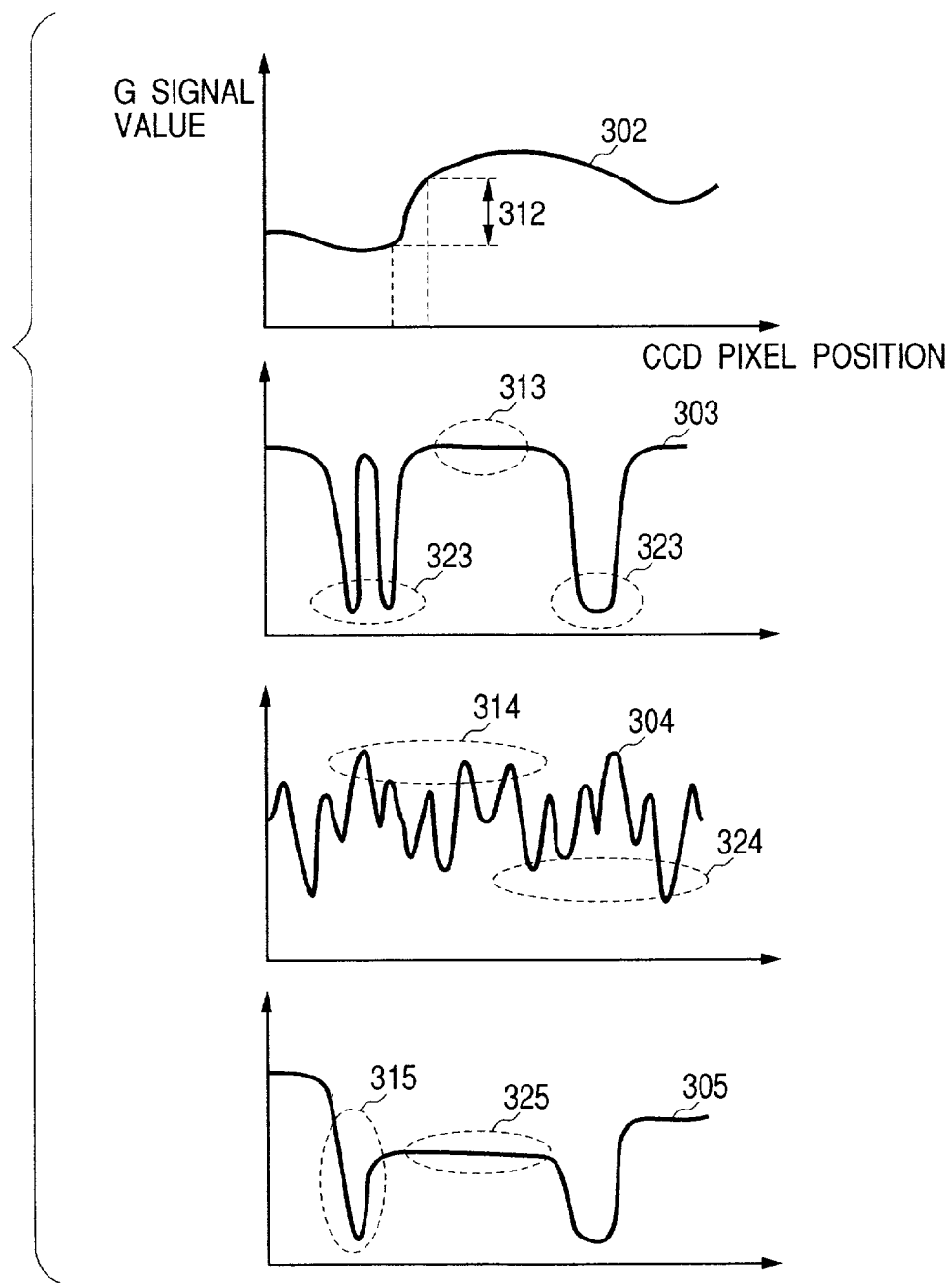
FIG. 3 is a diagram for explaining an example of an image area dividing process.

FIG. 2 shows an example of an original image and illustrates a state where a silver salt photograph area 202, a black character area 203, a mesh print area 204, and a color graphic area 205 exist mixedly in one page 201. The scanner scans the original image by the color CCD sensor and reads it as color digital signals (R, G, B) of each pixel. The read RGB signals have a feature which is determined in dependence on the attributes of each area of the image. If the G signal among signal values (R, G, B) read by the CCD sensor in each area is plotted in the pixel arranging direction of the CCD, for example, a diagram as shown in FIG. 3 is obtained. In FIG. 3, reference numerals 302, 303, 304, and 305 denote examples of characteristics which characteristically appear in the case where the areas 202 to 205 in FIG. 2 are read. An axis of abscissa denotes a pixel position in the pixel arranging direction of the CCD and an axis of ordinate indicates the read signal value. As the value approaches upward, the nearer the pixel approaches white (bright).

The feature of each area will be described. In case of the silver salt photograph area 202, the change 302 in image signal depending on the reading position is relatively gentle and a difference 312 of the pixel values of the pixels existing at a short distance is small. Reference numeral 303 denotes the characteristics of the black character area 203. Since black characters are written on a white background, a plot of its signal value shows characteristics such that the read signal value suddenly changes in a range from a white background portion 313 to a character portion 323. Reference numeral 304 denotes the characteristics of the mesh area 204. In case of the mesh area, since the white background 314 and a mesh 324 printed thereon are repeated, a plot of the signal value shows characteristics such that black and white are repeated at a high frequency as shown in the diagram. Reference numeral 305 denotes the plot diagram of a graphic area. In an edge portion 315 of graphic, the signal value suddenly decreases and an internal coloring portion 325 indicates characteristics such that a predetermined intermediate level continues.

To discriminate the above attributes, it is sufficient to detect the feature of each area as described above from the read signal values and discriminate. For this purpose, it is possible to use a feature extracting method using a well-known method based on a change amount of the image data near a target pixel, an accumulation value of the change amount in a predetermined interval, a luminance value (white background or a colored background) of a peripheral pixel, the number of times of change from white to black of the image data in a predetermined interval, or the like and to use a well-known attribute discriminating method based on the feature extracting method.

Figure 4C:
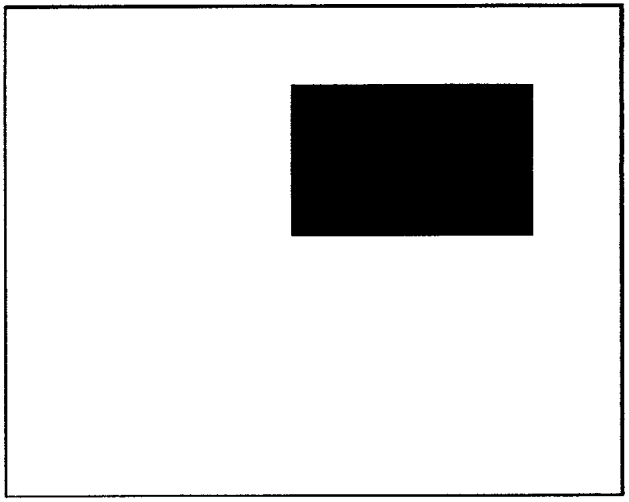
FIGS. 4A, 4B, and 4C are diagrams for explaining an example of flag data.
Figure 4B:
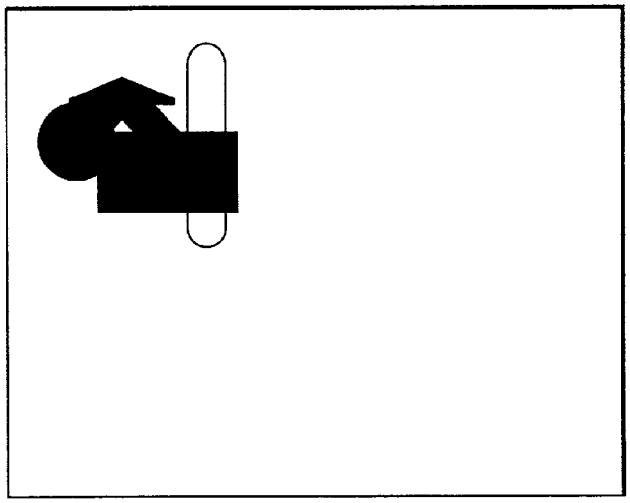
Figure 4A:
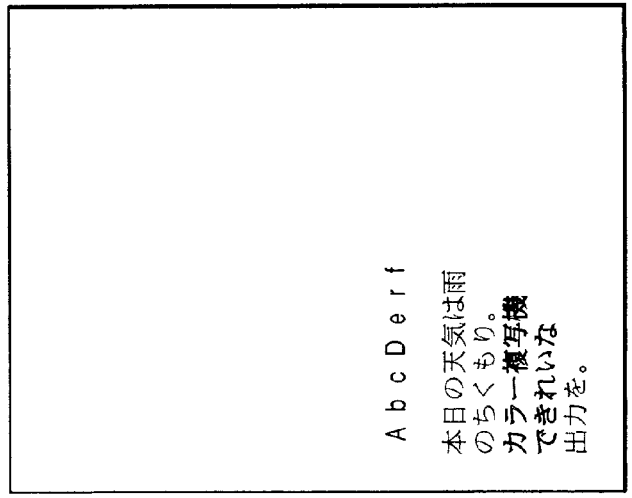

FIGS. 4A to 4C show an example of attribute flags formed for the original image of FIG. 2 as mentioned above. Although three kinds of flags of a character flag, a figure flag, and a mesh flag are formed here as attribute flags (flag data), the invention is not limited to them. FIG. 4A shows the character flag. A pixel shown in black in the diagram is a pixel having a character attribute, a character flag=1 is formed, and the other area is set to a character flag=0 (white portion in the diagram). FIG. 4B shows the figure flag corresponding to an area where it is set to 1 in the graphic area and to 0 in the other area. FIG. 4C shows the mesh flag corresponding to an area where it is set to 1 in the mesh area and to 0 in the other area.

Since the silver salt photograph area 202 does not correspond to any of those areas, all flags are set to 0 and it does not appear in FIGS. 4A to 4C.

If the image attributes are detected every pixel by the above image area dividing processes, image processes according to the image attributes are subsequently executed by a second input image process unit 104. In the unit 104, for example, a process to emphasize a sharpness of characters by emphasizing a high frequency component of the image can be performed to the character area, a process to remove a moire component that is peculiar to the digital image by performing what is called a low pass filter process can be performed to the mesh area, or the like. Those processes can be switched on a pixel unit basis in accordance with the attribute flag data generated by the image area division process block 103.

(Storage of Image Data)

The image data which was read by the scanner and subjected to the various input image processes and the attribute flag data formed by the above procedure are temporarily stored in a first image memory 105 and a first flag memory 106, respectively. In this instance, the image data and the attribute flag data are stored as partial images as much as a whole image of one page of the original or as much as a predetermined size of one page.

The image data and attribute flag data which have temporarily been stored are compressed by a data compression unit 109 and stored in a storage device 110. It is desirable that the storage device 110 is a storage medium such as a semiconductor storage medium which can be accessed at a high speed. In the data compression unit 109, different data compressing processes are performed to the image data and the flag data, respectively. That is, it is desirable that a high efficient compressing process such as a JPEG compression such as to make deterioration of the image inconspicuous is performed to the image data in consideration of the human visual characteristics although such a process is irreversible. On the other hand, it is preferable to use a reversible compression system such as a JBIG compression to the flag data because a dropout or change of the attribute flag information does not occur. The reduction of a data amount using the proper compressing method according to the kind of data can be realized by such a construction. In this manner, the image data and flag data to which the different compressing processes have been performed are stored in the storage device 110 on a page unit basis of the original. There is also a case where the stored data is written into an auxiliary storage device 111. As an auxiliary storage device 111, it is preferable to use a medium such as a hard disk which can store a large amount of data although a recording speed is slightly low. As mentioned above, by using the auxiliary storage device 111 such as a hard disk in addition to the storage device 110, the original images of a number of pages can be efficiently stored and accumulated.

(Reading of Image Data)

The image data and attribute flag data stored in the storage device 110 or auxiliary storage device 111 are read out in order to output them from a printer 117, the compression data is decompressed by a data decompression unit 112, and they are written into a second image memory 114 and a second flag memory 115, respectively. At this time, there is a case where pixel densities of the stored image data are converted in pixel density conversion units 113a and 113b. Such a pixel density conversion is used, for example, in the case where the user wants to enlarge or reduce the stored image data and print it out or the case where the user wants to layout-synthesize images of a plurality of stored pages onto one sheet of print output paper and output them as one paper.

Figure 5:
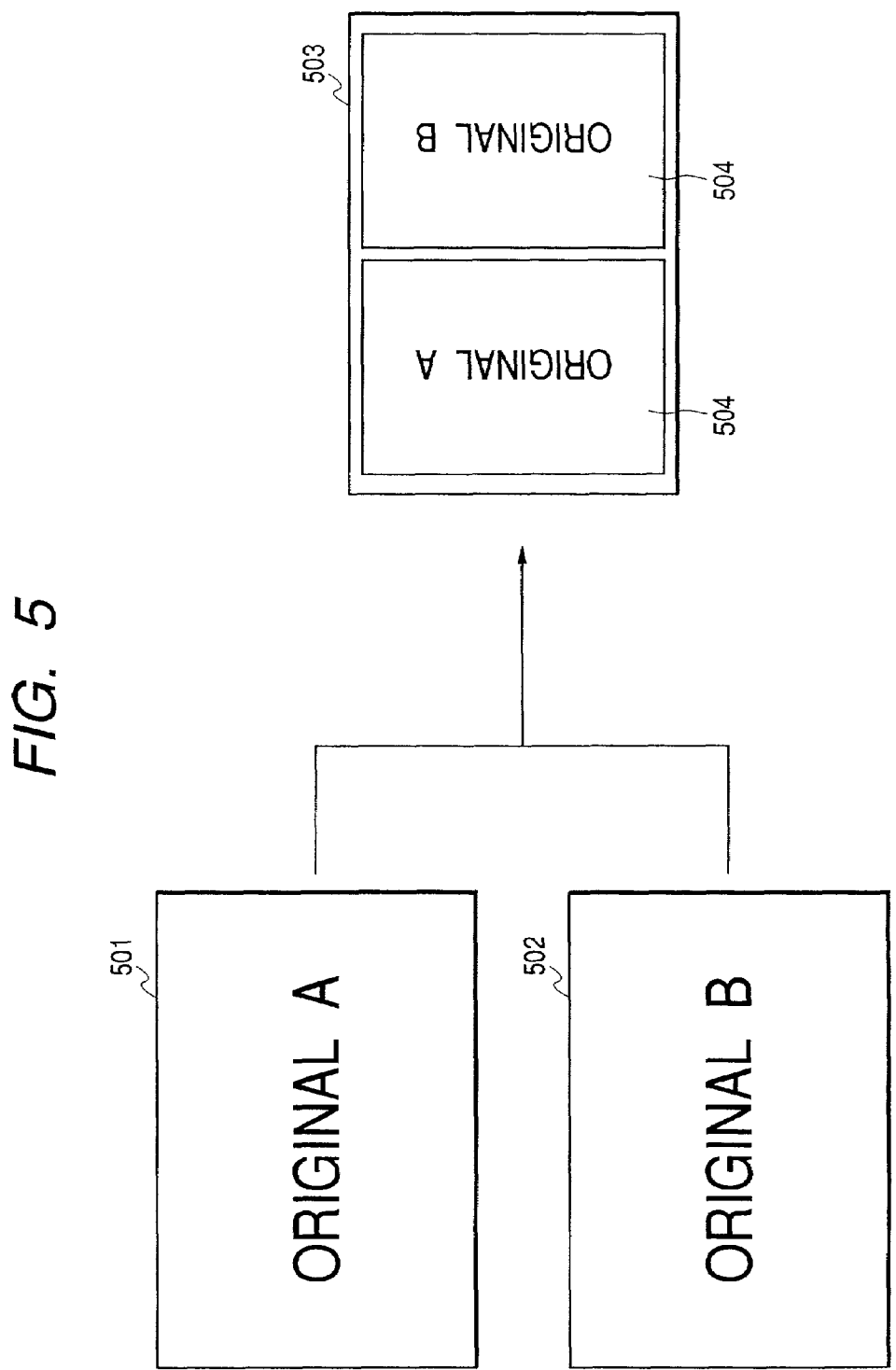
FIG. 5 is a diagram for explaining an example of a layout synthesis output.

As an example of the synthesis output of a plurality of pages, there is a case as shown in FIG. 5. That is, it is assumed that two original images 501 and 502 have previously been stored in the storage device 110. FIG. 5 relates to a case where those two sheets of images are synthesized onto one output paper of the same size as that of the original, thereby obtaining a print output as shown at 503. For this purpose, the stored image data 501 is first read out from the storage device 110 and the compressed data is decompressed. The decompressed data is reduced at a predetermined magnification by the first pixel density conversion unit 113a, rotated counterclockwise by 90° by a rotation process unit (not shown), and written into a predetermined area in the second image memory 114 (area corresponding to 504 in FIG. 5).

Subsequently, the image data 502 is read out from the storage device 110 and similarly subjected to decompression, resolution conversion, and rotating process. The resultant data is written into an area corresponding to 505 in the second image memory 114. In this instance, flag data corresponding to originals A and B are also similarly subjected to decompression, resolution conversion, and rotating process (the same magnification and the same rotating process as those for the image data). The resultant data is written into a corresponding area in the second flag memory 115. However, a pixel density converting process (reducing process) in this case is executed by the second pixel density conversion unit 113b. Since the image data is similarly zoomed and rotated with respect to the corresponding flag data, even in case of performing a layout print, adaptive image processes, which will be explained hereinlater, according to the flag data can be performed. It is desirable to use different methods for the pixel density conversion of the image data and the pixel density conversion of the flag data. For example, a well-known method such as linear interpolating method, bicubic spline interpolating method, or the like can be used for the image data. For the pixel density conversion of the flag data, it is desirable to use a pixel density converting method such as a nearest neighborhood processing method or the like that is adapted to binary data. The details will be explained hereinlater.

(Output of Image Data)

When the image data and flag data temporarily stored in the second image memory 114 and second flag memory 115 reach a predetermined size, they are transferred to an output image process unit 116. The output image process unit 116 executes well-known image processes for print outputting the RGB image data, namely, a luminance density conversion, an RGB→CMYK conversion, a gamma correction, a binarizing process, and the like and transfers the processed data to the printer 117. On the basis of the transferred image signals of CMYK, the printer 117 drives the semiconductor laser, and forms and outputs a visible image onto the transfer paper by a well-known procedure.

The flag data stored in the second flag memory 115 is used for switching the processes which are executed in the output image process unit 116. That is, by making masking coefficients of the RGB→CMYK conversion different in the photograph area and the character area, a picture quality of the output image can be improved. For example, conversion coefficients such that black characters can be reconstructed only by the black toner (that is, in the case where the image data is achromatic color, coefficients such that C, M, Y=0) are applied to the pixels in the character area, namely, the character flag=1. Coefficients such that even in case of the achromatic color, C, M, Y≠0 and deep black can be reconstructed can be applied to the other area.

In the binarizing process, the C, M, Y, and K signals are converted into binary signals of 0 or 1 by using a well-known error diffusion process or dither process. However, since priority is given to a sharpness of an output image in the character area or graphic area at this time, the error diffusion process is applied. Since importance is attached to a gradation in the photograph or mesh area, the dither process is applied. By switching the contents of the binarizing process in accordance with the attribute flag data in this manner, the picture quality of the output image can be improved.

Figure 6:
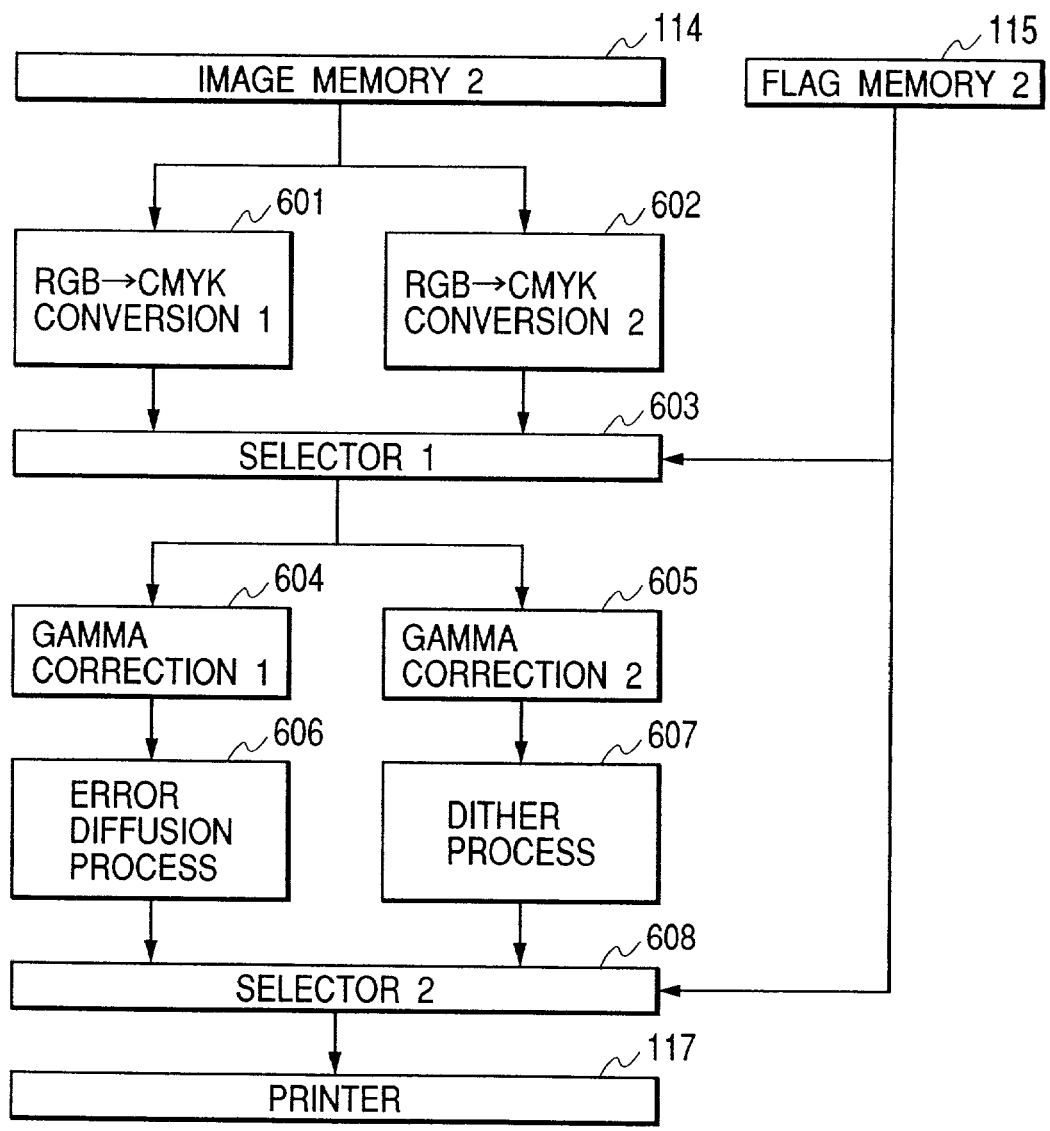
FIG. 6 is a block diagram showing an example of an output image processing construction.

FIG. 6 shows an example of a constructional block diagram for such processes. The second image memory 114, second flag memory 115, and printer 117 are the same as those in FIG. 1. The color image data of RGB read out from the second image memory 114 is inputted in parallel to RGB→CMYK converting circuits 601 and 602 and independently converted into the CMYK image signals, respectively. One of outputs of the CMYK converting circuits 601 and 602 is selected by a first selector 603 in accordance with a flag signal in the second flag memory 115. If conversion coefficients for the character area have been set in the CMYK converting circuit 601 and coefficients other than the conversion coefficients for the character area have been set in the CMYK converting circuit 602, the output of the CMYK converting circuit 601 is selected when the character flag in the second flag memory 115 is equal to 1. The output of the CMYK converting circuit 602 is selected when the character flag=0.

An output of the first selector 603 is also separated in parallel into two systems. One of them passes through a first gamma correction circuit 604 and an error diffusion binarization process unit 606 and is inputted as a binary CMYK signal to a second selector 608. The output of the first selector 603 also passes through a second gamma correction circuit 605 and a dither process binarizing circuit 607 and is also inputted as a binary CMYK signal to the second selector 608.

The second selector 608 selects an output of either the error diffusion process unit 606 or dither process unit 607 and transfers it to the printer 117. Since the error diffusion process is selected for the character area and flag area here, when the character flag=1 or figure flag=1, the second selector 608 selects the output of the error diffusion process unit 606. In the other cases, the second selector selects the output of the dither process unit 607.

(Pixel Density Conversion of Image Data)

The above pixel density converting method will be described in detail. Explanation will now be made with respect to a processing method in the case where the image data and flag data which were decompressed by the data decompression unit 112 are enlarged or reduced by the pixel density conversion units 113a and 113b and outputted to the second image memory 114 and second flag memory 115.

FIGS. 7A and 7B are graphs obtained by plotting the image data and flag data which were read, respectively. An axis of abscissa denotes a pixel position (coordinate) in the arranging direction of the CCD in the image reader and an axis of ordinate indicates a pixel value (0 to 255) and a flag value (0 or 1) of the image, respectively. FIG. 7A shows, for example, the G signal among the R, G, and B signals. FIG. 7B shows, for example, the character flag among a plurality of flag data.

In the diagram, white circles 701 and 702 indicate data of one pixel, respectively. In the embodiment, since a reading resolution of the image reader is equal to 600 dpi, an interval between the respective pixels corresponds to 600 dpi (25.4/600 mm) as a value on the original.

A case of reducing such image data into, for example, 0.75 time will now be considered. (This magnification corresponds to a reduction ratio in the example of FIG. 5). In this case, it is necessary to newly form pixel values at the positions shown by arrows of broken lines in the diagram and form the image data after the reduction. This process corresponds to the process for reducing and thinning out three pixels of the original image data and forming data of two pixels. Therefore, if the coordinate after the reduction arrives at a position 703, it is sufficient to set the original image data to the pixel values of the image after the reduction as they are. However, when it reaches positions 704, it is necessary to perform an interpolating arithmetic operation and form the data from the pixel values before and after the target pixel. If the linear interpolating method is used for this purpose, the pixel values after the reduction become as shown by black circles in FIG. 7C. Since each pixel value 705 in the diagram corresponds to the coordinate position 703, it is nothing but the pixel value of the inherent corresponding coordinate. However, since each pixel value 706 corresponds to the coordinate 704, it is replaced with a mean value of two adjacent pixels of the original pixel values sandwiching the position of 704.

The above processes are executed by the first pixel density conversion unit 113a.

A reducing process of the flag data will now be described. Since the resolution of the flag data is equal to that of the image data, FIG. 7B shows the same pixel arrangement as that of FIG. 7A. The pixel coordinate corresponding to the reduced data in case of reducing the data into 0.75 time is set to a position shown by an arrow of a broken line even in FIG. 7B in a manner similar to FIG. 7A. Therefore, although a pixel value 709 corresponding to a coordinate 707 is nothing but the pixel value of the inherent corresponding coordinate in FIG. 7B, it is necessary to arithmetically operate a pixel value 710 corresponding to a coordinate 708 from the neighboring pixel values (flag values) on both sides of the pixel value 710 and form it.

However, since the flag data in FIG. 7B is binary information of 0 or 1, the foregoing linear interpolating method cannot be applied. Therefore, it is sufficient to use here a construction such that the pixel value (flag value) existing at the nearest distance position among the original image coordinates corresponding to the pixel positions after the reduction is used as a pixel value after the reduction. This method is called a nearest neighborhood reducing process.

However, if such a method is simply used, it will be understood that the pixel value corresponding to a pixel 711 of "1" in FIG. 7B is changed to the pixel value 710 in FIG. 7D after completion of the conversion and has been extinguished. Therefore, it is assumed that a processing method whereby the OR obtained by the neighboring flag values on both sides of the pixel position after the reduction is set to the flag value after the reduction is used. By using this method, the pixel value after the reduction becomes as shown at 712 and a situation such that the inherent flag information before the reduction is dropped out by the reducing process can be prevented.

The above processes are executed by the second pixel density conversion unit 113b.

If the reduction image data and reduction flag data formed as mentioned above are stored in the second image memory 114 and second flag memory 115, a print output reduced by the procedure described above can be obtained.

Figure 8:
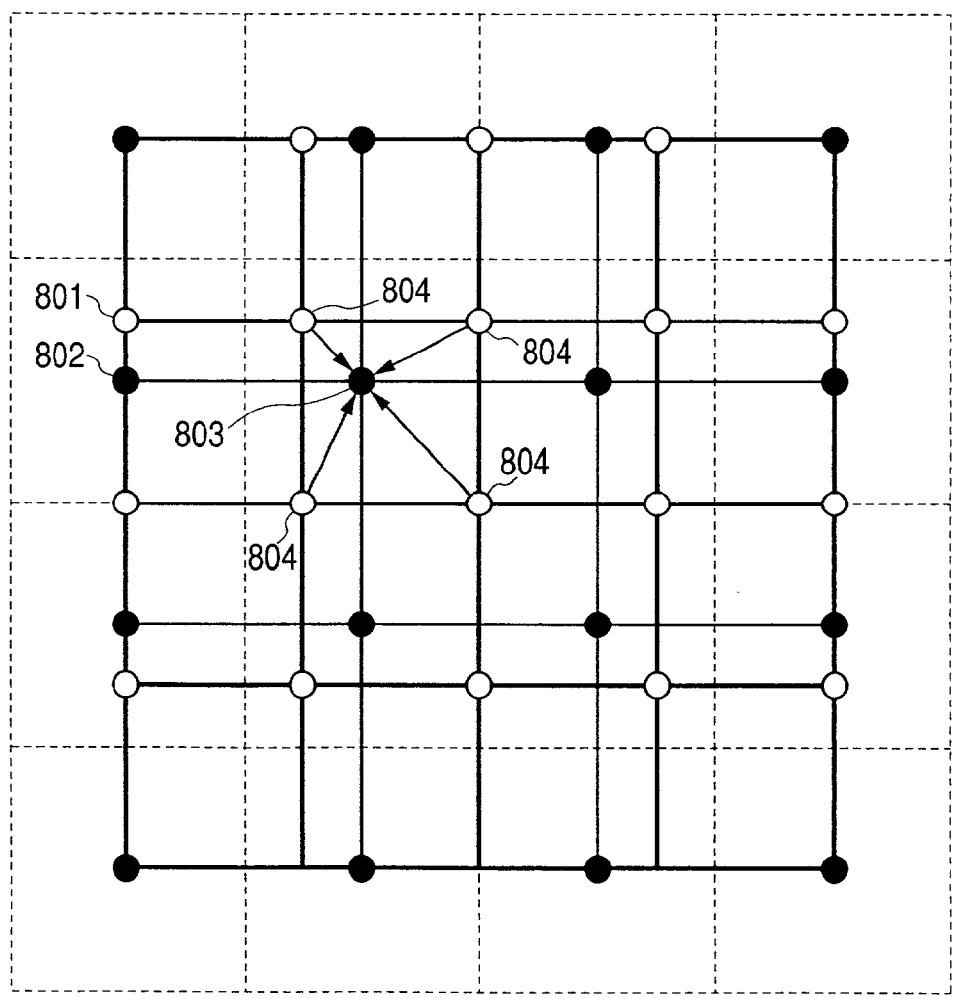
FIG. 8 is a diagram for explaining an example of a process in a 2-dimension of the pixel density converting method.

Although the explanation has been made here on the assumption that the image data and flag data are arranged as a one-dimensional array, the linear zooming method can expand the image data to the 2-dimensional data as is well known. A zooming process of the flag data can be also expanded to a 2-dimension. FIG. 8 is a diagram for explaining a case where the zooming method of the flag data has been expanded into the 2-dimension. In the diagram, data shown by a white circle 801 indicates flag data of the original image before the zoom and has a value of 0 or 1. A black circle 802 indicates a position of a pixel to be formed after the zoom (reduction in this case) and the data shown by the black circle also has a value of 0 or 1. Now, assuming that a position of the target pixel is located at 803, flag data after the zoom 803 can be obtained by getting the OR by using all of four original image flag data 804 surrounding the target pixel 803. That is, 0 is formed as a target pixel if all of the four pixels shown at 804 are equal to 0, and 1 is formed in the other cases.

Although the explanation has been made on the assumption that the pixel values after the zoom are formed by the OR process of the near pixels, the invention is not limited to such a case. For example, there are considered various methods such as method whereby only one nearest pixel is detected and set to the same value as that of the target pixel, method whereby the number of pixels of "1" among the peripheral near pixels is counted and, if a count value is equal to or larger than a predetermined value, the pixel value after the zoom is set to 1, and the like.

The forming (generating) method of the pixel value can be also changed after the zoom in accordance with a zoom ratio. For example, it is also possible to perform processes such that if the zoom ratio is smaller than 1 (reduction), the target pixel value is formed by the OR of a plurality of pixels near the target pixel, and if the zoom ratio is larger than 1 (enlargement), the pixel value of one pixel existing at the nearest position of the target pixel is formed as a target pixel value as it is.

The forming method of the pixel value can be also changed after the zoom in accordance with attributes of the flag. Although three kinds of flags of the character attribute, figure attribute, and mesh attribute have been shown in the embodiment, there is also a case where a discrimination result about whether the OR process is suitable or the replacement to only one near pixel is suitable upon reduction differs every attribute. Therefore, for example, if the character flag and figure flag are reduced by the OR process and the mesh flag is reduced by the process for replacing the target pixel value with the nearest neighboring pixel value, an effect such that an error decision flag in the case where a mesh decision precision is not enough is eliminated upon reducing process can be expected. If a method whereby the number of pixels whose flag data is equal to 1 among the peripheral neighboring pixels is counted and if a count value is equal to or larger than a predetermined value, the pixel after the zoom is set to 1 is used for the mesh flag, even if the mesh flag is erroneously equal to 1 in a region out of the mesh area in the erroneous discrimination, since no mesh flag exists at positions around the target pixel, the count value is not equal to the predetermined value or more and the influence by the erroneous decision can be eliminated.

It is also possible to use a construction such that a manual switching unit for switching the interpolating method of the flag data and a sampling instructing unit for allowing a sampling print (thumbnail print) to be outputted are provided for the operation unit, the actual print is executed in response to a sampling output instruction, and the operator is allowed to select the interpolating method by a manual instruction. Further, it is also possible to execute a process such that an offset is given to sampling coordinates in the pixel density conversion. FIGS. 9A and 9B are diagrams for explaining processes in such a case.

FIG. 9A is a diagram for explaining a pixel density conversion of image data in a manner similar to that in FIG. 7A. A start position shown by an arrow corresponding to the pixel position after completion of the pixel density conversion has been shifted by ΔX as shown at 903. An interval between the arrows is the same as that shown in FIGS. 7A to 7D.

By using the above method, a situation such that the case where the inherent pixel value is outputted as it is and the case where the original pixel values are interpolated and outputted alternately occur is eliminated and all output pixel values are formed by interpolation arithmetic operations between the neighboring adjacent pixels, so that there is a case where the picture quality is improved.

As mentioned above, in the case where the offset has been given to the sampling position by the first pixel density conversion unit, it is necessary to also set the same offset value ΔX to the second pixel density conversion unit. Such a state is shown in FIG. 9B. A start position 907 of the output pixel position is shifted by ΔX in a manner similar to the case of FIG. 9A.

Since a distance relation between the output pixel position and the original pixel position is deviated in this case, the adjacent pixels on both sides to be subjected to the OR calculation are different from those in FIGS. 7A to 7D and the corresponding position relation between the pixel after the pixel density conversion of the image data and the pixel after the pixel density conversion of the flag data is preferably held.

Another Embodiment

Although a flow of the image data from the scanner 101 in FIG. 1 has been described above, the processes in the first embodiment can be also similarly applied to image data which is inputted from an external communication path 119 through a communication interface 118.

As typical data which is sent from the external communication path 119, there is image data described by what is called PDL (page description language). The PDL data which is inputted here is a group of commands describing an image. If PDL data is interpreted and converted into bit map data similar to the scanner read image, it can be applied as it is.

That is, the PDL data inputted from the communication I/F 118 is converted into an intermediate language format called a display list by an interpreter 108. The display list is sent to an RIP (raster image processor) 107 and developed into bit map data. The developed image data is stored in the first image memory 105. At this time, the RIP 107 forms attribute information of the image data which was rasterized simultaneously with it as flag data and stores it into the first flag memory 106.

In this instance, the process for forming the flag data by an image area dividing process with reference to the image data as described in the first embodiment is unnecessary here. It is sufficient to form the flag data of the corresponding pixel of the rasterized image with reference to the attribute information (information indicative of a photograph, characters, graphics, or the like) held every part in the PDL data which is inputted to the RIP.

That is, if a PDL command to form character parts is inputted to the RIP 107, it is sufficient that the RIP 107 forms a bit map image of the character data and, at the same time, forms the character flag (=1) as flag data corresponding to the area where the character has been formed. If the image data and flag data were formed as mentioned above, the subsequent processes can be executed in substantially the same manner as those in the first embodiment.

Figure 11:
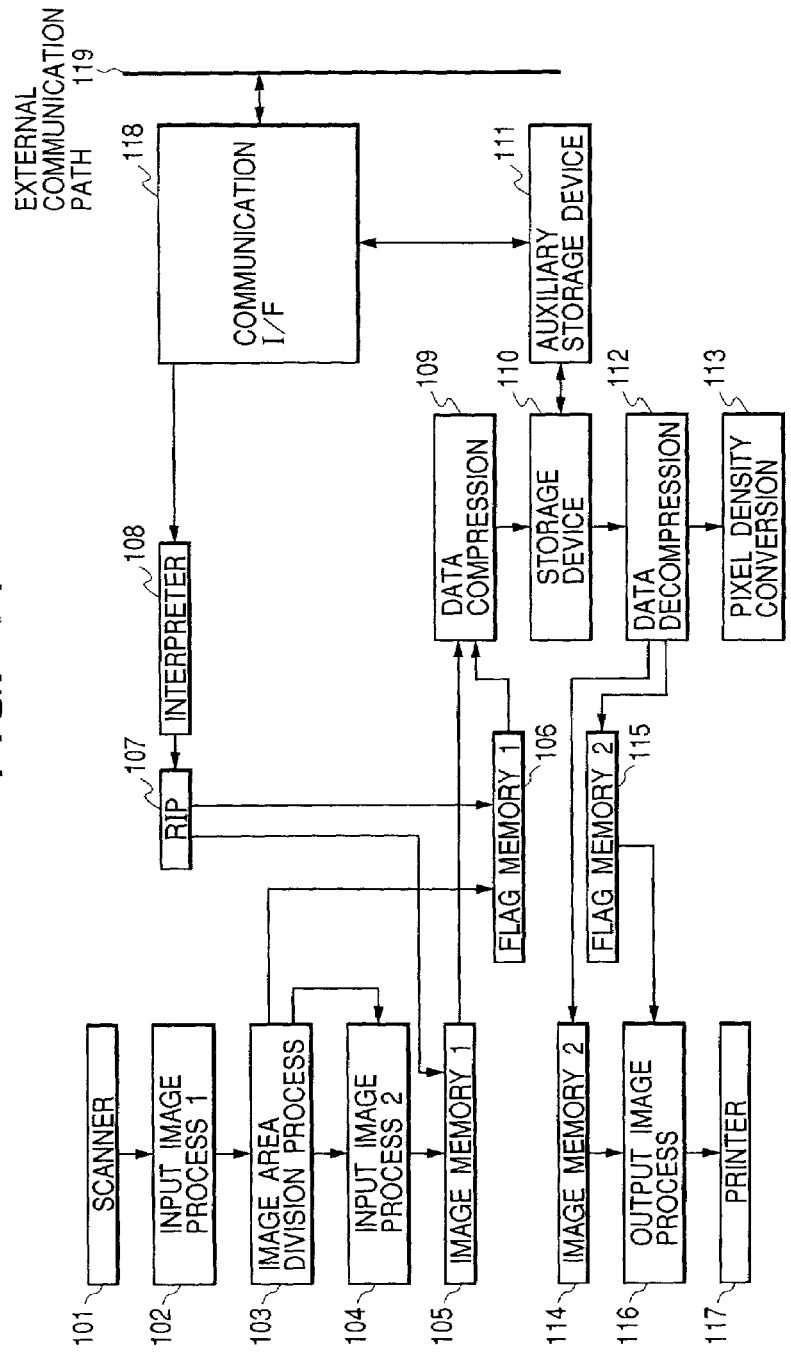
FIG. 11 is a block diagram showing a schematic construction of an image processing apparatus to which the invention can be applied.

Although two pixel density conversion units have been provided in FIG. 1, the pixel density conversion can be also performed in one pixel density conversion unit as shown in FIG. 11.

Other Embodiments of the Invention

A processing method whereby a program for making the construction of the above embodiment operative so as to realize the functions of the embodiment mentioned above is stored in a storage medium, the program stored in the storage medium is read out as codes, and operations are executed by a computer in accordance with the read-out program codes is also incorporated in the purview of the foregoing embodiment. The storage medium in which the program has been stored is also incorporated in the embodiment.

As such a storage medium, for example, a floppy disk, a hard disk, an optical disk, a magnetooptic disk, a CD-ROM, a magnetic tape, a non-volatile memory card, or an ROM can be also used.

The invention is not limited to the example in which the processes are executed by the sole program stored in the storage medium but a case where the program operates on the OS in cooperation with another software and functions of an expansion board and the operations of the embodiment are executed is also incorporated in the purview of the foregoing embodiment.

As described above, a data output which makes the handling of the image easy and enables a high quality image output to be performed without bearing a heavy load on the user can be performed, and the image can be formed at an arbitrary zoom ratio. An image memory capacity can be also suitably determined in accordance with the kind of data to be stored. Further, the pixel density converting process can be also adaptively performed and the improvement of the picture quality can be also realized.

The same processes can be performed in both case where the original image is read by the scanner and a print is outputted and case where a print image using the PDL (page description language) is outputted. The optimum image processes can be performed to individual parts constructing the image at an arbitrary zoom ratio. An output image of a high picture quality can be obtained in any case.

The present invention is not limited to the foregoing embodiments but many modifications and variations are possible within the spirit and scope of the appended claims of the invention.

What is claimed is:

1. An image processing apparatus comprising:
    input means for inputting color image data;
    generating means for generating flag data indicating an attribute of an image corresponding to the color image data from the color image data, with respect to each pixel of the image, the flag data indicative of a character, a figure or a mesh with respect to each pixel of the image;
    first pixel density converting means for pixel density converting the image data at a designated magnification;
    second pixel density converting means for pixel density converting the flag data in accordance with the designated magnification; and
    output means for making a process of the pixel density converted image data different every pixel in accordance with the flag data and outputting the processed image data,
    wherein a pixel converting method of said first pixel density converting means is different from a pixel converting method of said second pixel density converting means,
    said second pixel density converting means makes a converting method different in accordance with attributes of the flag data, and
    said second pixel density converting means, when the designated magnification is reduction, performs an arithmetic operating process of flag values using a plurality of pixels near a target pixel with respect to the flag data indicative of a character and a figure, and performs a processing using a nearest neighboring pixel of the target pixel, with respect to the flag data indicative of a mesh.

2. An apparatus according to claim 1, wherein when the flag data is a character flag, said output means performs a sharpness emphasis to the image data.

3. An apparatus according to claim 1, wherein when the flag data is a mesh flag, said output means performs a low pass filter process to the image data.

4. An apparatus according to claim 1, wherein said generating means generates the flag data on the basis of a change in image data of a pixel near a target pixel.

5. An apparatus according to claim 1, wherein said first pixel density converting means uses one of a linear interpolating method and bicubic spline interpolation.

6. An apparatus according to claim 1, wherein said output means makes a binarizing process to the image data different in accordance with the flag data.

7. An apparatus according to claim 6, wherein when the flag data is the character flag or figure flag, an error diffusion process is performed to the image data.

8. An apparatus according to claim 1, wherein said output means changes color conversion coefficients in accordance with the flag data and performs a color converting process of the image data.

9. An apparatus according to claim 1, wherein in the case where said input means inputs data described by a page description language from a computer, said generating means generates the flag data on the basis of attribute information of the page description language.

10. An image processing method comprising the steps of:
inputting color image data;
generating flag data indicating an attribute of an image corresponding to the color image data from the color image data, with respect to each pixel of the image, the flag data indicative of a character, a figure or a mesh with respect to each pixel of the image;
pixel density converting the image data at a designated magnification;
pixel density converting the flag data in accordance with the designated magnification; and
making a process of the pixel density converted image data different every pixel in accordance with the flag data and outputting the processed image data to a printer,
wherein a pixel converting method of said step of pixel density converting the image data is different from a pixel converting method of said step of pixel density converting the flag data,
said step of pixel density converting the flag data includes making a converting method different in accordance with attributes of the flag data,
and said step of pixel density converting the flag data, when the designated magnification is reduction, includes performing an arithmetic operating process of flag values using a plurality of pixels near a target pixel with respect to the flag data indicative of a character and a figure, and includes performing a processing using a nearest neighboring pixel of the target pixel, with respect to the flag data indicative of a mesh.

11. A computer-readable storage medium which stores a program for allowing an image processing apparatus to execute said program comprising the steps of:
inputting color image data;
generating flag data indicating an attribute of an image corresponding to the color image data from the color image data, with respect to each pixel of the image, the flag data indicative of a character, a figure or a mesh with respect to each pixel of the image;
pixel density converting the image data at a designated magnification;
pixel density converting the flag data in accordance with the designated magnification; and
making a process of the pixel density converted image data different every pixel in accordance with the flag data and outputting the processed image data to a printer,
wherein said step of pixel density converting the flag data includes making a converting method different in accordance with attributes of the flag data,
and said step of pixel density converting the flag data, when the designated magnification is reduction, includes performing an arithmetic operating process of flag values using a plurality of pixels near a target pixel with respect to the flag data indicative of a character and a figure, and includes performing a processing using a nearest neighboring pixel of the target pixel, with respect to the flag data indicative of a mesh.

12. An image processing apparatus comprising:
input means for inputting color image data;
generating means for generating flag data indicating an attribute of an image corresponding to the color image data from the color image data, with respect to each pixel of the image, the flag data indicative of a character, a figure or a mesh with respect to each pixel of the image;
first pixel density converting means for pixel density converting the image data at a designated magnification;
second pixel density converting means for pixel density converting the flag data in accordance with the designated magnification; and
output means for making a process of the pixel density converted image data different every pixel in accordance with the flag data and outputting the processed image data,
wherein a pixel converting method of said first pixel density converting means is different from a pixel converting method of said second pixel density converting means,
said second pixel density converting means makes a converting method different in accordance with attributes of the flag data, and
said second pixel density converting means, when the designated magnification is reduction, performs an arithmetic operating process of flag values using a plurality of pixels near a target pixel with respect to the flag data indicative of a character and a figure, and performs a processing of counting the number of pixels of which flag data is 1 in the peripheral neighboring pixels and setting the pixel after the magnification change to 1 if the counted value exceeds a predetermined value, with respect to the flag data indicative of a mesh.

13. An image processing method comprising the steps of:
inputting color image data;
generating flag data indicating an attribute of an image corresponding to the color image data from the color image data, with respect to each pixel of the image, the flag data indicative of a character, a figure or a mesh with respect to each pixel of the image;
pixel density converting the image data at a designated magnification;
pixel density converting the flag data in accordance with the designated magnification; and
making a process of the pixel density converted image data different every pixel in accordance with the flag data and outputting the processed image data,
wherein a pixel converting method of said step of pixel density converting the image data is different from a pixel converting method of said step of pixel density converting the flag data,
said step of pixel density converting the flag data makes a converting method different in accordance with attributes of the flag data, and
said step of pixel density converting the flag data, when the designated magnification is reduction, includes performing an arithmetic operating process of flag values using a plurality of pixels near a target pixel with respect to the flag data indicative of a character and a figure, and includes performing a processing of counting the number of pixels of which flag data is 1 in the peripheral neighboring pixels and setting the pixel after the magnification change to 1 if the counted value exceeds a predetermined value, with respect to the flag data indicative of a mesh.

14. A computer-readable storage medium which stores a program for allowing an image processing apparatus to execute said program comprising the steps of:

inputting color image data;

generating flag data indicating an attribute of an image corresponding to the color image data from the color image data, with respect to each pixel of the image, the flag data indicative of a character, a figure or a mesh with respect to each pixel of the image;

pixel density converting the image data at a designated magnification;

pixel density converting the flag data in accordance with the designated magnification; and making a process of the pixel density converted image data different every pixel in accordance with the flag data and outputting the processed image data, wherein a pixel converting method of said step of pixel density converting the image data is different from a pixel converting method of said step of pixel density converting the flag data, said step of pixel density converting the flag data makes a converting method different in accordance with attributes of the flag data, and said step of pixel density converting the flag data, when the designated magnification is reduction, includes performing an arithmetic operating process of flag values using a plurality of pixels near a target pixel with respect to the flag data indicative of a character and a figure, and includes performing a processing of counting the number of pixels of which flag data is 1 in the peripheral neighboring pixels and setting the pixel after the magnification change to 1 if the counted value exceeds a predetermined value, with respect to the flag data indicative of a mesh.

* * * * *

UNITED STATES PATENT AND TRADEMARK OFFICE
CERTIFICATE OF CORRECTION

PATENT NO. : 7,365,873 B2
APPLICATION NO. : 09/769330
DATED : April 29, 2008
INVENTOR(S) : Kenichi Ohta It is certified that error appears in the above-identified patent and that said Letters Patent is hereby corrected as shown below:

[75] INVENTOR

"Kenichi Ohta, Kanagawa-ken (JP)" should read --Kenichi Ohta, Kawasaki (JP)--.

COLUMN 1

Line 58, "are" should be deleted.

COLUMN 5

Line 55, "high" should read --highly--.

COLUMN 10

Line 15, "1 is" should read --1, and--.

COLUMN 11

Line 45, "are" should be deleted.
Line 47, "is" should read --are--.

Signed and Sealed this

Seventh Day of October, 2008

JON W. DUDAS
*Director of the United States Patent and Trademark Office*